United States Patent [19]

Wallace

[11] Patent Number: 5,555,485
[45] Date of Patent: Sep. 10, 1996

[54] DEVICE AND METHOD FOR INSULATING A DRY FILM CAPACITOR

[75] Inventor: Caryl L. Wallace, Arlington Heights, Ill.

[73] Assignee: Philips Electronics North America Corporation, New York, N.Y.

[21] Appl. No.: 346,322

[22] Filed: Nov. 29, 1994

Related U.S. Application Data

[63] Continuation of Ser. No. 94,277, Jul. 19, 1993, abandoned.

[51] Int. Cl.⁶ ........................................ H01G 2/02
[52] U.S. Cl. .................. 361/272; 361/301.1; 361/809; 361/811; 29/25.42; 174/52.1; 174/138 G
[58] Field of Search .................. 29/25, 42, 832; 174/52.1, 138 G, DIG. 2; 24/458; 248/27.1, 27.3, 201; 242/118.6, 118.61; 313/49; 361/271, 272, 301.1, 301.5, 306.1, 307, 308.1, 308.3, 309, 321.6, 807, 809, 811, 812, 821, 825, 517–521, 535–539

[56] References Cited

U.S. PATENT DOCUMENTS

| | | | |
|---|---|---|---|
| 3,125,710 | 3/1964 | Kaplan | 361/301.5 |
| 3,436,610 | 4/1969 | Sparrow et al. | 361/519 |
| 3,700,099 | 10/1972 | Heroux | 242/118.61 |
| 4,059,848 | 11/1977 | Koel et al. | 361/272 |
| 4,339,786 | 7/1982 | Evans et al. | 361/272 |
| 4,486,809 | 12/1984 | Deak et al. | 361/272 |
| 4,748,536 | 5/1988 | Robinson | 361/272 |
| 4,755,153 | 7/1988 | Limanowski et al. | 439/741 |
| 5,148,347 | 9/1992 | Cox et al. | 361/272 |
| 5,406,187 | 4/1995 | Harrison | 320/2 |

FOREIGN PATENT DOCUMENTS

| | | |
|---|---|---|
| 1935595 | 3/1966 | Germany. |
| 1820906 | 4/1966 | Germany. |
| 989427 | 4/1965 | United Kingdom ................ 361/301.5 |

Primary Examiner—Teresa J. Walberg
Assistant Examiner—Gregory L. Mills
Attorney, Agent, or Firm—Edward Blocker; Bernard Franzblau

[57] ABSTRACT

A device and method for insulating a dry film capacitor includes a pair of electrically non-conductive discs having knurled protrusions extending therefrom. The dry film capacitor includes a core for receivingly engaging the protrusions to thereby secure the discs to the capacitor. The discs are dimensioned such that the discs when placed on the interior surface of a ballast can serve as supports for the capacitor by raising the capacitor away from contact with the ballast can. In connecting the discs to the capacitor, the protrusions are twistingly pushed into the core of the capacitor.

18 Claims, 3 Drawing Sheets

DEVICE AND METHOD FOR INSULATING A DRY FILM CAPACITOR

This is a continuation of application Ser. No. 08/094,277, filed Jul. 19, 1993, now abandoned.

BACKGROUND OF THE INVENTION

This invention relates generally to an insulating device and method for insulating a capacitor, and more particularly to a device and method for insulating a dry film capacitor within a ballast can.

Conventional ballast circuitry typically includes a dry film capacitor connected to a secondary winding of a transformer. The capacitor is generally insulated from the ballast housing (i.e. ballast can) through the insertion of paper therebetween or by wrapping plastic around the capacitor.

These conventional insulating methods are time consuming and require considerable physical labor resulting in an undesirable increase in manufacturing cost. Paper inserts are also capable of absorbing moisture from the air. Such absorption before potting and from tar after potting detrimentally affects the capacitive properties of the capacitor thereby shortening its effective life expectancy.

SUMMARY OF THE INVENTION

Generally speaking, in accordance with the invention, an assembly includes a pair of electrically non-conductive discs having knurled protrusions extending therefrom and an electrical component (such as, but not limited to, a dry film capacitor) having recesses for receivingly engaging the protrusions to thereby secure the discs to the electrical component. The recesses are positioned at either end of the electrical component.

The assembly, in accordance with the invention, overcomes both the moisture absorption problem of paper and the time consuming, labor intensive drawback of paper and plastic wrap in insulating a dry film capacitor. The electrically non-conductive discs neither absorb moisture and can be easily and quickly connected to the dry film capacitor for insulating the latter.

The discs are preferably made of plastic and are dimensioned such that when placed on a planar surface (e.g. the interior surface of the ballast housing), they serve as supports for the electrical component. In supporting the electrical component, the discs raise the electrical component away from contact with the planar surface thereby insulating the electrical component from the planar surface.

Preferably, each protrusion has a major axis which extends in a direction substantially perpendicular to the direction of its associated disc. The electrical component includes metallized sides. A pair of leads are connected to the metallized sides in order to connect the electrical component to one or more other components. In accordance with a feature of the invention, the electrical component has a core which serves as the recesses for the electrical component.

In accordance with a second aspect of the invention, a device for insulating an electrical component includes at least one electrically non-conductive disc and at least one associated electrically non-conductive protrusion having knurls thereon. Each protrusion, which is integrally connected to the associated disc, is adapted for connection to the electrical component.

In accordance with this second aspect of the invention, the protrusion includes at least a tapered portion. The knurls extend from about the integral connection with the associated disc onto the tapered portion. Each protrusion includes a major axis extending in a direction substantially perpendicular to the direction of the associated disc. Each protrusion also has proximal and distal ends, a hollow interior and an opening at each end. The openings are in spatial communication with each other through the hollow interior. Each disc also has an opening in spatial communication with the opening at the proximal end of the associated protrusion. Preferably, the openings of the disc and proximal end are non-circular in order to provide a positive driving force in press fitting the protrusion within a core of a dry film capacitor.

In accordance with a third aspect of the invention, a method for assembling a capacitor within a ballast housing includes the steps of connecting a pair of electrically non-conductive discs to the capacitor by inserting knurled protrusions of the disc into a core of the capacitor to form an insulated capacitive device and positioning the insulated capacitive device within the ballast housing by placing the discs of the device on the interior surface of the housing. The discs insulate the capacitor from the interior surface by raising the capacitor away from contact with the interior surface. In accordance with this third aspect of the invention, connection of the discs to the capacitor includes twistingly pushing the knurled protrusions into the capacitor core.

Accordingly, it is an object of the invention to provide an improved device and method for insulating a dry film capacitor which minimizes manufacturing cost and is relatively easy to assemble.

It is another object of the invention to provide an improved device and method for insulating a dry film capacitor in which the moisture absorption problems encountered by paper insulators is substantially eliminated.

It is a further object of the invention to provide an improved device and method for insulating a dry film capacitor in which the time consuming, labor intensive requirements of conventional insulating devices is substantially eliminated.

Still other objects and advantages of the invention will, in part, be obvious, and will, in part, be apparent from the specification.

The invention accordingly comprises several steps and the relation to one or more such steps with respect to each of the others, and the device embodying features of construction, combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in combination with the accompanying drawings, in which.

DETAILED DESCRIPTION OF THE PREFERRED EMBODIMENT

Figure 1:
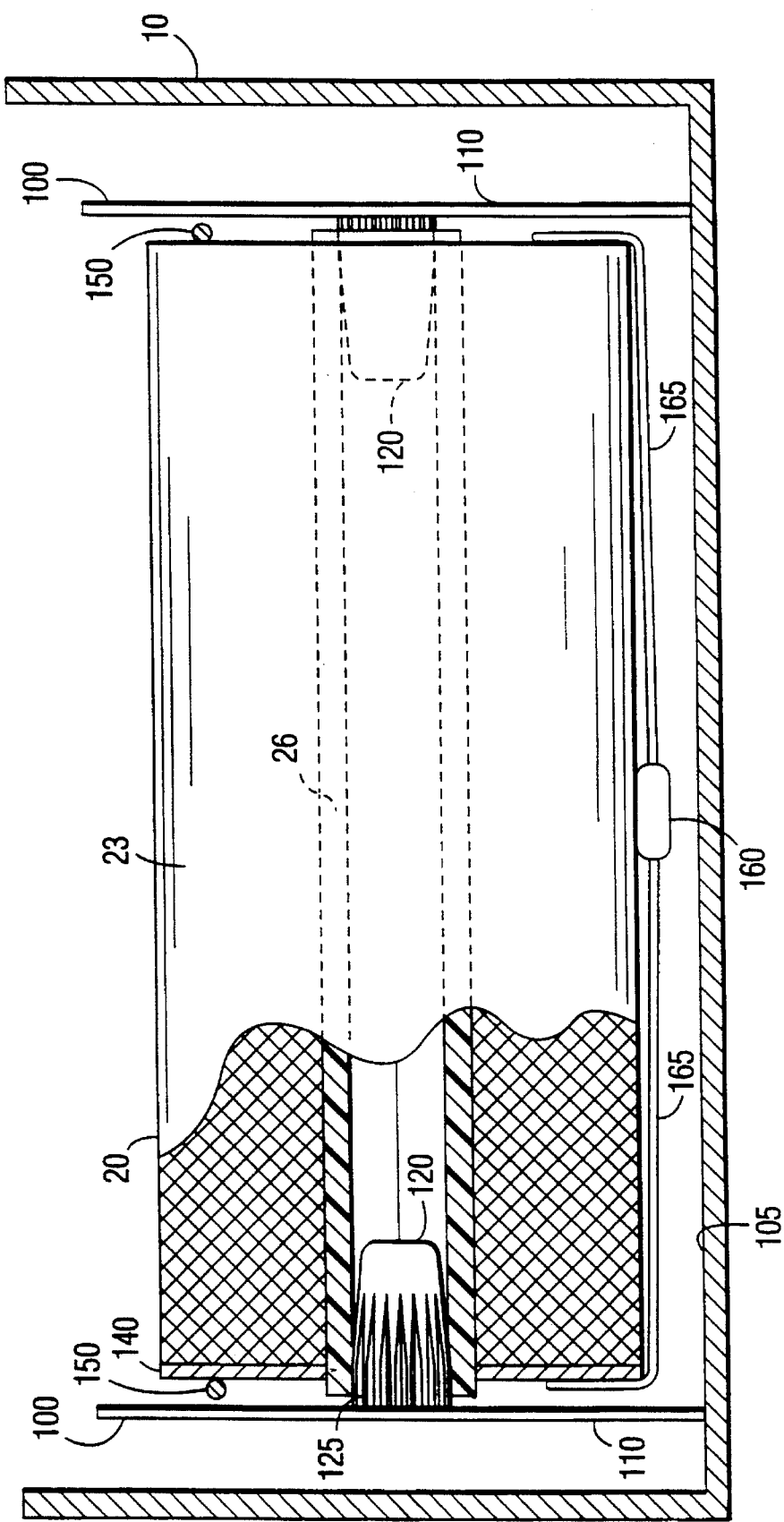
FIG. 1 is a sectional view of a capacitor insulated from a ballast housing in accordance with the invention.

As shown in FIG. 1, a housing such as a ballast can 10 encloses a capacitor 20 which is electrically insulated from can 10 by a pair of insulating devices 100. Capacitor 20, which is made from a metallized film 23 preferably of polyester or propylene, is spaced away from ballast can 10 by insulating devices 100. The thickness of the metallized film ranges typically from about 2 microns to about 9 to 10 microns. Film 23 is wound around an electrically non-conductive core 26.

Core 26, typically made from plastic, has a circular outer diameter and a hexagonal inner diameter. The peripheral shape of the inner diameter of core 26 need not be hexagonal. Other peripheral shapes can be employed provided such other shapes are operable for receiving a mandrel (not shown) for the purpose of spinning core 26 in order to wind film 23 therearound. In particular, the peripheral shape of the inner diameter of core 26 when slipped over a mandrel should result in little and preferably no slippage of core 26 as core 26 is spun by the mandrel in winding film 23 about core 26.

Figure 5:
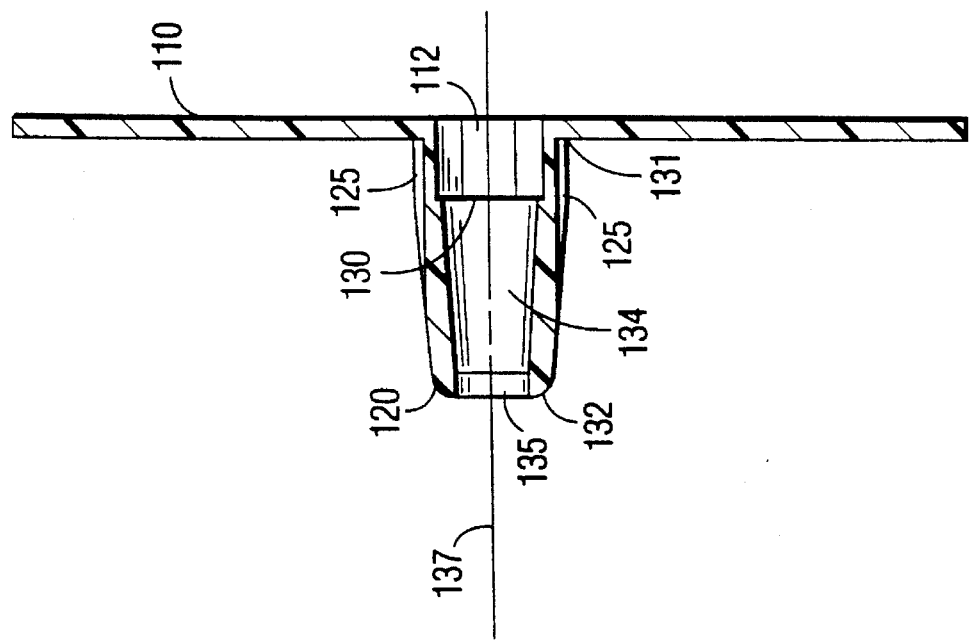
FIG. 5 is a sectional view of the insulating device taken along lines 5—5 of FIG. 3.
Figure 4:
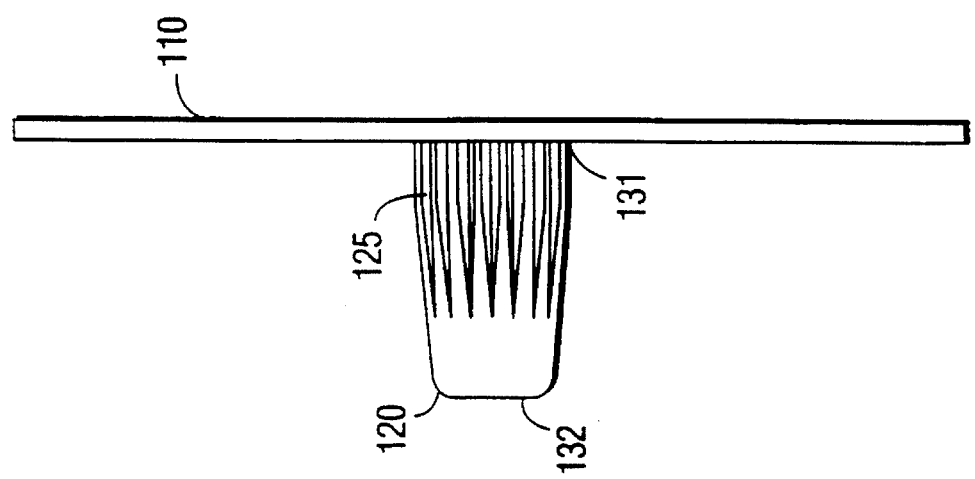
FIG. 4 is a front elevational view of the insulating device.

Each insulating device 100 includes a disc 110 having a knurled protrusion 120. Protrusions 120 extend inwardly toward each other within core 26. As shown in FIGS. 1, 4 and 5, each protrusion 120 includes a plurality of grooves 125 about its exterior surface extending from disc 110 slightly more than approximately half way along a major axis 137 of protrusion 120. As shown in FIG. 5, axis 137 extends in a direction which is substantially perpendicular to the direction of disc 110. Protrusion 120 is tapered and has a proximal end 131 and a distal end 132. An outer hexagonal opening 130 at proximal end 131 preferably has a smaller diameter than the inner diameter of core 26. Disc 110 also has an opening 112 which conforms to opening 130 of protrusion 120. Consequently, a continuous single opening extending from disc 110 into protrusion 120 is formed through which an instrument can be inserted for driving device 100 into core 26. Protrusion 120 also has a substantially circular inner opening 135 at distal end 132.

A substantially hollow interior 134 is in spatial communication with openings 130 and 135. Protrusion 120 is made of a relatively flexible material in providing a snug fit when protrusion 120 is inserted within core 26. The deformable characteristics of protrusion 120 are enhanced through the spatial communication between hollow interior 134 and inner opening 135. In other words, protrusion 120 is capable of being bent out of shape when fully inserted within core 26 to accommodate the slightly smaller opening of core 26 in order to provide a snug, frictional fit within the latter. Device 100 should be made from a material such as, but not limited to, a plastic which is somewhat flexible (elastic) and resilient and is also relatively hard (at least near and around the junction joining protrusion 120 to disc 110) so as to not collapse when protrusion 120 is pushed into core 26.

In pushing (i.e. driving) each protrusion 120 into core 26, an instrument, such as a hexagon key, is inserted through opening 112 of disc 110 into opening 130 of protrusion 120 so as to twistingly, press fit protrusions 120 within core 26. Openings 130 and 112 need not be hexagonal in shape provided the shape adopted permits positive drive (i.e. without slippage) of device 100 in turning protrusion 120 as the latter is pushed into core 26.

Figure 2:
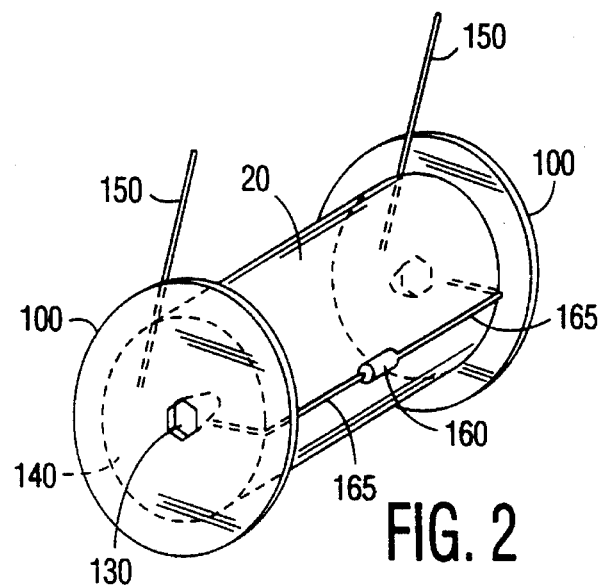
FIG. 2 is a perspective view of the capacitor and insulating devices of FIG. 1.

Referring now to FIGS. 1 and 2, each edge 140 of capacitor 20 is sprayed with tin-zinc or other suitable metallic material for connecting a pair of lead wires 150 and, if desired, for connecting a bleeder resistor 160 thereto via leads 165. Lead wires 150 connect capacitor 20 to at least one other component such as, for example, a secondary winding of a transformer (not shown).

The shape of disc 110 should be substantially circular thereby eliminating the need to connect lead wires 150 at a predetermined location on disc 110. More particularly, and as shown in FIG. 1, in positioning the insulated capacitor assembly (i.e. capacitor 20 and the pair of insulating devices 100) within ballast can 10, there is no specific portion of each disc which must rest (be in contact with) an interior planar surface 105 of ballast can 10. Shapes other than substantially circular for disc 110 would increase manufacturing cost by requiring the time consuming positioning of lead wires 150 relative to that edge of disc 110 which is to be seated on interior planar surface 105 of ballast can 10.

Figure 3:
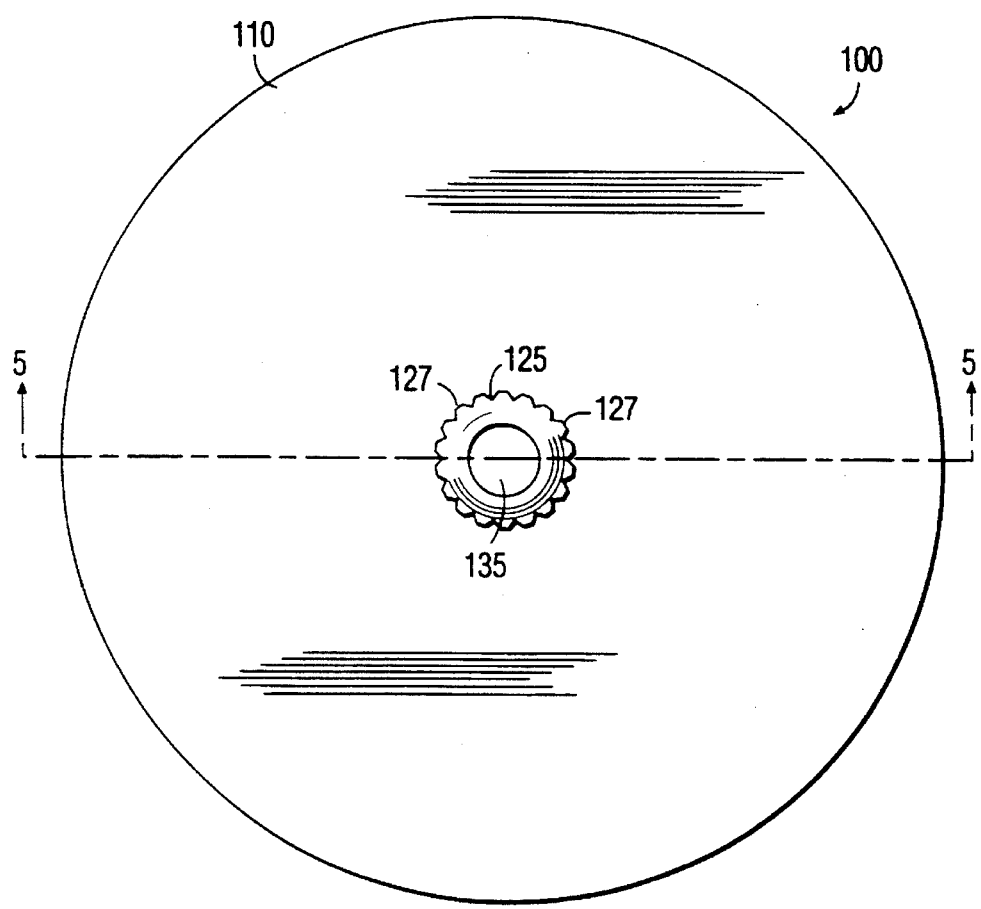
FIG. 3 is a side elevational view of an insulating device.

As shown in FIG. 3, grooves 125 on protrusion 120 result in the formation of a plurality of knurls 127. As protrusion 120 is concurrently pushed into core 26 and rotated, knurls 127 engage the inner hexagonal diameter of core 26. Preferably, the maximum outer diameter of protrusion 120 is slightly larger than the inner hexagonal diameter of core 26 to secure each protrusion 120 within core 26 and therefore connect each device 100 to capacitor 20.

In assembling the insulated capacitor assembly within ballast can 10, film 23 is first wound around core 26 and then sprayed with metallic film (e.g. tin-zinc) thereby adding a coating of metallic film to edges 140 of capacitor 20. Lead wires 150 and, if desired, bleeder resistor 160 are then attached to edges 140 through lead wires 165. Each device 100 is now secured to capacitor 20 by rotatingly inserting protrusions 120 within core 26. The entire insulated capacitor assembly is next dipped in a wax for moisture protection and then is connected to one or more other components (e.g. secondary winding of a transformer). The one or more components connected to the insulted capacitor assembly are then together placed within ballast can 10 and potted with tar so as to encapsulate same to promote heat transfer and to provide further electrical insulation.

Referring once again to FIG. 1, insulating devices 100 together serve to separate capacitor 20 from interior planar surface 105 of ballast can 10 so as to provide the necessary electrical insulation therebetween. Each device 100 can be easily positioned on surface 105 of ballast can 10 to properly maintain connection of the insulated capacitor assembly through leads 150 to one or more other elements within ballast can 10. Assembly of the insulated capacitor assembly is simple and can be performed relatively quickly.

It will thus be seen that the objects set forth above, among those made apparent from the preceding description, are efficiently attained and since certain changes may be made in the above construction without departing from the spirit and scope of the invention, it is intended that all matter contained in the above description and shown in the accompanying drawings shall be interpreted as illustrative and not in a limiting sense.

For example, in accordance with an alternative embodiment of the invention, only one device 100 need be used provided disc 100 is positioned so as to lay flat on surface 105 with capacitor 20 standing straight up.

It is also to be understood that the following claims are intended to cover all of the generic and specific features of the invention herein described, and all statements of the scope of the invention which, as a matter of language, might be said to fall therebetween.

What is claimed is:

1. An assembly for insulating an electrical component, comprising:
   an electrical component having a core with a non-circular bore therein,
   a pair of electrically non-conductive discs each having an electrically non-conductive protrusion made of a flexible material and having grooves thereon and being integrally connected to the disc, wherein at least one protrusion has a hollow interior and a distal end with an opening therein and a circular outer periphery, and;
   each protrusion is press fitted into the non-circular bore of said electrical component thereby to provide a frictional connection between the circular distal end of the protrusion and the non-circular bore of the electrical component.

2. The assembly of claim 1, wherein said protrusion further includes at least a tapered portion, said grooves extending from about the integral connection with the associated disc onto said tapered portion.

3. The assembly of claim 2, wherein each protrusion has a proximal and a distal end, a hollow interior and an opening at each end, the openings being in spatial communication with each other through the hollow interior, and each disc has an opening in spatial communication with the opening at the proximal end of the associated protrusion.

4. The device of claim 3, wherein the openings of the disc and proximal end are not circular.

5. The assembly of claim 1, wherein each protrusion has a proximal and a distal end, a hollow interior and an opening at each end, the openings being in spatial communication with each other through the hollow interior, and each disc has an opening in spatial communication with the opening at the proximal end of the associated protrusion.

6. The device of claim 5, wherein the openings of the disc and proximal end are not circular.

7. The assembly as claimed in claim 1 wherein the electrical component comprises a capacitor that includes a hollow core devoid of any electrically conductive means which serves as the bore of said electrical component, and said pair of discs are spaced apart from said electrical component so that only the protrusions make direct contact with the electrical component.

8. An assembly comprising:
   a pair of electrically non-conductive discs including grooved protrusions extending therefrom;
   an electrical component having a pair of protrusion receiving means for receivingly engaging said protrusions to thereby secure said discs to said electrical component such that said pair of protrusions provide the sole direct support for said electrical component, each of said pair of protrusion receiving means being positioned at a respective end of the electrical component, and
   a planar surface with said discs placed on the planar surface and dimensioned so as to serve as supports for said electrical component and to insulate the electrical component from the planar surface by raising said electrical component away from contact with the planar surface.

9. The assembly of claim 8, wherein said pair of discs are spaced apart from said electrical component so that only the protrusions contact the electrical component, and the electrical component includes metallized sides and a pair of leads, each lead being connected to one of the metallized sides.

10. The assembly of claim 8, wherein the electrical component includes a core having a bore therein with only a dielectric within said bore, wherein said core serves as the pair of protrusion receiving means.

11. The assembly of claim 8, wherein each protrusion has proximal and distal ends, a hollow interior and an opening at each end, the openings being in spatial communication with each other through the hollow interior, and each disc has an opening in spatial communication with the opening at the proximal end of the associated protrusion.

12. The assembly of claim 8, wherein the electrical component is a dry film capacitor that includes a tubular core which serves as the pair of protrusion receiving means.

13. The assembly of claim 12, wherein each protrusion has a hollow interior with an opening at each end, and each protrusion comprises a flexible material with a deformable characteristic and said tubular core has an opening slightly narrower than the protrusions such that a snug fit is provided between each protrusion and the tubular core.

14. A method for assembling a capacitor within a ballast housing, comprising the steps of:
   connecting a pair of electrically nonconductive discs to the capacitor by twistingly pushing and inserting grooved protrusions of the disc into a core of the capacitor to form an insulated capacitive device; and
   positioning the insulated capacitive device within the ballast housing by placing the discs of the device on the interior surface of the housing such that the discs insulate the capacitor from the interior surface by raising the capacitor away from contact with the interior surface.

15. An assembly comprising:
   a pair of electrically non-conductive discs including grooved protrusions extending therefrom;
   an electrical component having a pair of protrusion receiving means for receivingly engaging said protrusions to thereby secure said discs to said electrical component such that said pair of protrusions provide the sole direct support for said electrical component, each of said pair of protrusion receiving means being positioned at a respective end of the electrical component, and which further comprises:
   an electrically conductive housing for a discharge lamp ballast in which said assembly is mounted so that said discs are supported on an interior surface of the housing in a manner so as to provide a space between the electrical component and the housing thereby to insulate the electrical component from the ballast housing, said housing being dimensioned to contain further discrete circuit elements of the lamp ballast.

16. The assembly as claimed in claim 15 wherein the electrical component comprises a dry film capacitor having an elongate hollow core operative as the pair of protrusion receiving means, and each protrusion is made of flexible material having a deformable characteristic, said hollow core and said protrusions being dimensioned to provide a press fit therebetween.

17. The assembly as claimed in claim 16 wherein the distal end of each protrusion has an opening therein.

18. The assembly as claimed in claim 16 wherein each disc has an opening in spatial communication with an opening at the proximal end of its associated protrusion.

\* \* \* \* \*